United States Patent [19]
Cromer et al.

[11] Patent Number: 6,166,688
[45] Date of Patent: Dec. 26, 2000

[54] DATA PROCESSING SYSTEM AND METHOD FOR DISABLING A PORTABLE COMPUTER OUTSIDE AN AUTHORIZED AREA

[75] Inventors: Daryl Carvis Cromer, Cary; Richard Alan Dayan, Wake Forest; Brandon Jon Ellison, Raleigh; Eric Richard Kern, Durham; Howard Locker, Cary, all of N.C.

[73] Assignee: International Business Machines Corporation, Armonk, N.Y.

[21] Appl. No.: 09/282,394

[22] Filed: Mar. 31, 1999

[51] Int. Cl.[7] ........................................... H04B 7/185
[52] U.S. Cl. .............................. 342/357.17; 342/357.06; 342/457; 701/213; 340/825.54
[58] Field of Search .................. 342/357.17, 357.01, 342/357.06, 450, 451, 457; 701/213; 340/825.31, 825.54; 455/13.4

[56] References Cited

U.S. PATENT DOCUMENTS

| | | | |
|---|---|---|---|
| 5,243,652 | 9/1993 | Teare et al. | 380/21 |
| 5,406,261 | 4/1995 | Glenn | 340/571 |
| 5,483,244 | 1/1996 | Grube et al. | 342/463 |
| 5,515,043 | 5/1996 | Berard et al. | 340/988 |
| 5,532,690 | 7/1996 | Hertel | 340/989 |
| 5,615,236 | 3/1997 | Turney | 375/365 |
| 5,640,139 | 6/1997 | Egeberg | 340/426 |
| 5,748,084 | 5/1998 | Isikoff | 340/568 |
| 5,790,074 | 8/1998 | Rangedahl et al. | 342/357 |
| 5,796,178 | 8/1998 | Onuma | 307/10.2 |
| 5,811,886 | 9/1998 | Majmudar | 307/10.2 |
| 5,936,526 | 8/1999 | Klein | 340/571 |
| 5,939,975 | 8/1999 | Tsuria et al. | 340/426 |

OTHER PUBLICATIONS

"Personal Computer with Integrated Global Positioning System," IBM Technical Disclosure Bulletin, vol. 37, No. 02B, Feb. 1994.

*Primary Examiner*—Thomas H. Tarcza
*Assistant Examiner*—Dao L. Phan
*Attorney, Agent, or Firm*—George E. Grosser; Andrew J. Dillon

[57] ABSTRACT

A data processing system and method are disclosed for disabling a portable computer in response to the portable computer being moved outside of an authorized area of use. An authorized, geographical area of use is established. The authorized, geographical area is any geographical area capable of being defined. The geographical area is not limited to areas within an enclosure, and is not bounded by a transmitter's broadcast range. A determination is made regarding whether the portable computer is located outside of the authorized area. If the portable computer is moved outside of the authorized area, the portable computer is disabled. The portable computer is inoperable when disabled.

30 Claims, 5 Drawing Sheets

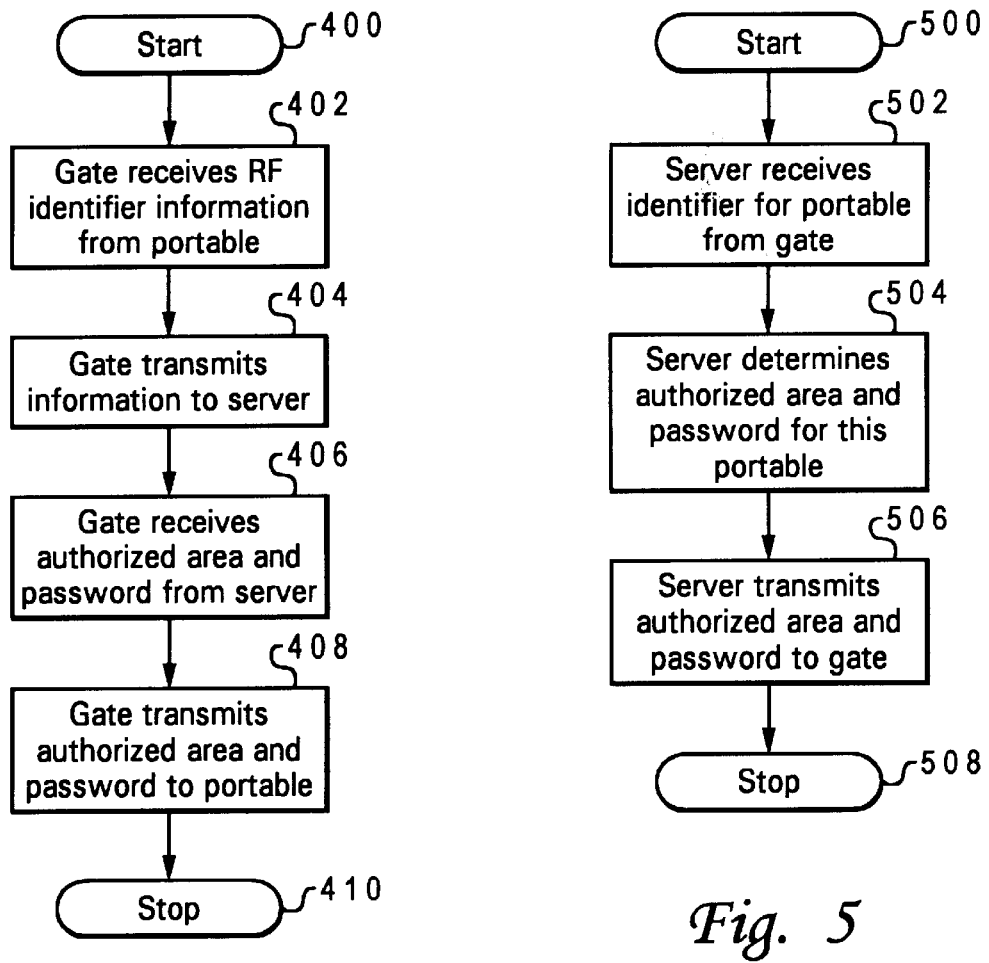
*Fig. 4*
*Fig. 5*
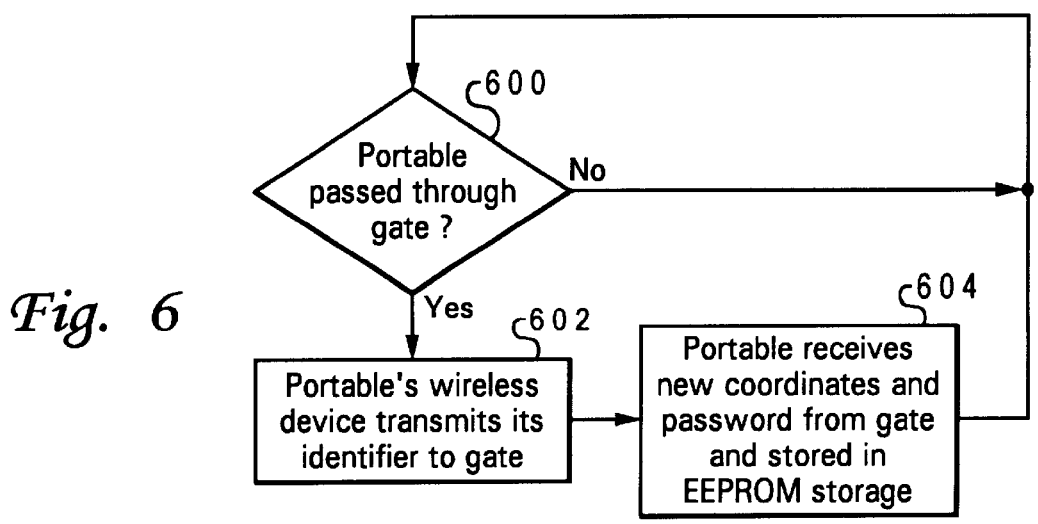
*Fig. 6*

DATA PROCESSING SYSTEM AND METHOD FOR DISABLING A PORTABLE COMPUTER OUTSIDE AN AUTHORIZED AREA

BACKGROUND OF THE INVENTION

1. Field of the Invention

The present invention relates in general to data processing systems and, in particular, to a data processing system and method for disabling a portable computer when the portable computer is outside an authorized, geographical area. Still more particularly, the present invention relates to a data processing system and method for disabling a portable computer when the portable computer is outside an authorized, geographical area utilizing a global positioning system device.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as, a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Portable computers are one of the most stolen electronic devices on the market today. After being stolen, a portable computer is typically removed from its area of origin and resold in another area. This prevents local police from easily recovering the computer.

In one known system for protecting portable computers, the portable computer is capable of receiving a cellular telephone signal causing the activation of a beacon unit. Once the owner of a portable computer discovers the computer is stolen, the owner of the system may cause the transmission of a beacon signal. When the portable computer receives the beacon signal, it activates a security program to protect the computer's files. The beacon signal is transmitted to the portable computer utilizing cellular telephone technology regardless of the physical location of the portable computer. This system requires the owner of the portable to first determine that the portable has been stolen, and then take steps to activate the beacon signal. A significant amount of time may pass before the owner discovers the portable computer missing. The thief will likely have already accessed the portable's files and data, and may have been able to disable the beacon unit within the portable prior to the owner causing the transmission of the beacon signal.

Known systems exist for tracking the physical location of vehicles. Many of the systems utilize the Global Positioning System to determine a physical location of a particular vehicle. The Global Positioning System (GPS) is an accurate, three-dimensional navigation system. The GPS includes a constellation of twenty-one satellites and three spares that orbit the earth twice a day at an altitude of 10,898 miles. The satellites orbit the earth in six overlapping orbital planes which are based on the equatorial plane of the earth. The orbits of the satellites enable any GPS receiver near the surface of the earth to receive signals from at least four satellites at any one time, although precise position information can be obtained with only three satellites. A GPS receiver can be located in mobile units such as aircraft or ground vehicles to enable them to precisely locate their global positions. Each satellite continuously broadcasts pseudo-random codes at L-band frequencies, L1 at 1575.42 MHz and L2 at 1227.6 Mhz. Each satellite broadcasts a slightly different signal and each satellite broadcasts two types of signals. One of these signals is referred to as C/A code, which is a signal that can be received by civilian type GPS receivers. The other signal is referred to as P code, which is a signal that can be received only by military type GPS receivers.

Ground stations on the earth receive transmissions from the satellites. These transmissions are analyzed and GPS time is compared with universal standard time at the ground stations. Corrections are transmitted to receivers in each of the satellites from the ground station. The signals which include the time the signal left the satellite, are broadcast from the satellites and decoded by the GPS receiver using triangulation techniques provided by software in the receiver to determine the location. Specifically, the interval between the transmission and the reception of the satellite signal is used to calculate the unit's distance from each of the satellites being used. Those distances are used in the algorithms to compute the receiver's position.

Therefore a need exists for a data processing system and method for disabling a portable computer when it has been moved outside an authorized, geographical area.

SUMMARY OF THE INVENTION

A data processing system and method are disclosed for disabling a portable computer in response to the portable computer being moved outside of an authorized area of use. An authorized, geographical area of use is established. The authorized, geographical area is any geographical area capable of being defined. The geographical area is not limited to areas within an enclosure, and is not bounded by a transmitter's broadcast range. A determination is made regarding whether the portable computer is located outside of the authorized area. If the portable computer is moved outside of the authorized area, the portable computer is disabled. The portable computer is inoperable when disabled.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 4 depicts a high level flow chart which illustrates a gate communicating with a portable computer system which passed through the gate in accordance with the method and system of the present invention;

FIG. 5 illustrates a high level flow chart which depicts a server computer system transmitting an authorized, geographical area for a particular portable computer in accordance with the method and system of the present invention; and FIG. 6 depicts a high level flow chart which illustrates a portable computer system receiving updated coordinates when moved through a gate in accordance with the method and system of the present invention.

DETAILED DESCRIPTION OF A PREFERRED EMBODIMENT

Figure 1:
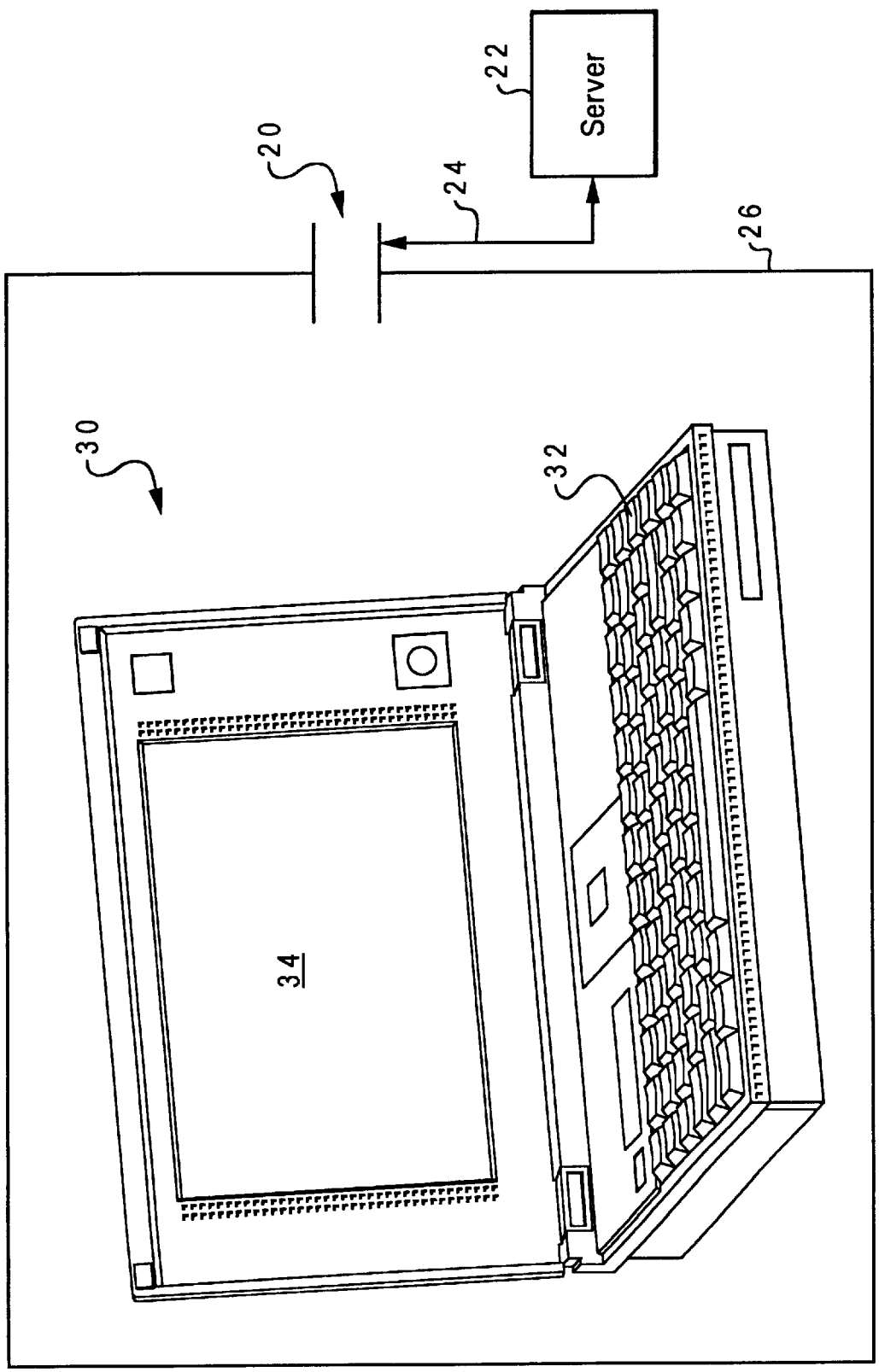
FIG. 1 illustrates a pictorial representation of a data processing system in accordance with the method and system of the present invention.

A preferred embodiment of the present invention and its advantages are better understood by referring to FIGS. 1–6 of the drawings, like numerals being used for like and corresponding parts of the accompanying drawings.

The present invention is a method and system for disabling a portable computer in response to the portable computer being moved outside of an authorized, geographical area of use. The authorized, geographical area may be any geographical area capable of being defined.

The geographical area is any defined surface area of the Earth. It is not limited to areas within an enclosure, and is not bounded by a transmitter's broadcast range. In a preferred embodiment, the geographical area is defined utilizing a center latitude, center longitude, and radius from this center point. Of course, other shapes of areas may be defined including any type of irregular shape.

The hardware included within the portable computer constantly checks to determine whether the portable has been moved outside of the authorized area. When the portable computer determines that it has been moved outside the authorized area, the portable computer disables itself.

Thereafter, the portable computer is not operable until a user enters a privileged access password.

The portable computer includes a GPS device for receiving the current geographical location of the portable, and a power security unit. The definition of the authorized area, along with a privileged access password, is stored in the power security unit. The power security unit receives the current geographical location from the GPS device and compares the current location of the portable to the authorized, geographical area. If the power security unit determines that the portable computer is outside of the authorized area, the power security unit will output a power control signal to the power supply causing the power supply to cease supplying full system power.

The authorized area may be modified either by a user or by moving the power computer through a gate. A user may modify the definition of the authorized area after the user has correctly entered the privileged access password. The power security unit determines whether the user correctly entered the privileged access password. If the correct password was entered, the power security unit will permit modification, or update, of the stored authorized area.

The gate includes a transmitter and receiver. A wireless device included within the portable computer detects when it is passed through a gate. When the portable computer is moved through the gate, the portable computer's wireless device transmits information to the gate identifying the particular portable computer. The gate then forwards this information to a server computer. The server computer utilizes the identifying information to look up an authorized area to be associated with this portable computer, as well as a privileged access password. The server then transmits this information to the gate which forwards it to the portable computer.

The power security unit within the portable computer receives the authorized area and password. If the power security unit determines that the password is the correct password, the power security unit will update the authorized area by storing the new authorized area within the power security unit.

In this manner, the portable computer will automatically disable itself by ceasing the supply of full system power whenever it detects that it has been moved outside the authorized area.

FIG. 1 illustrates a pictorial representation of a data processing system in accordance with the method and system of the present invention. Portable computer 30 includes a display 34, and a keyboard 32. Portable computer 30 may be implemented utilizing any commercially available portable computer system which has been suitably programmed and which has been modified as described below.

An authorized area of use is defined for portable computer 30. The area may be any geographical area. In the preferred embodiment, the area is a geographical area capable of being defined utilizing a location detection device, such as the global positioning system (GPS). In one embodiment, the area may be defined utilizing a center point and a distance from the center point. Thus, coordinates describing a center longitude, a center latitude, and a radius are necessary. Other embodiments may define the area utilizing an algorithm to calculate the area, permitting irregularly shaped areas.

In addition to an authorized, geographical area, portable computer 30 may be located within a location 26 controlled by a gate 20 through which portable computer 30 may pass. Gate 20 includes a wireless transmitter/receiver connected to server 22. It is capable of transmitting information to/from portable 30. Location 26 is typically a work location such as a room or building. Gate 20 is coupled to a server 22 utilizing a network 24, wireless signals, or other connection means.

Figure 2:
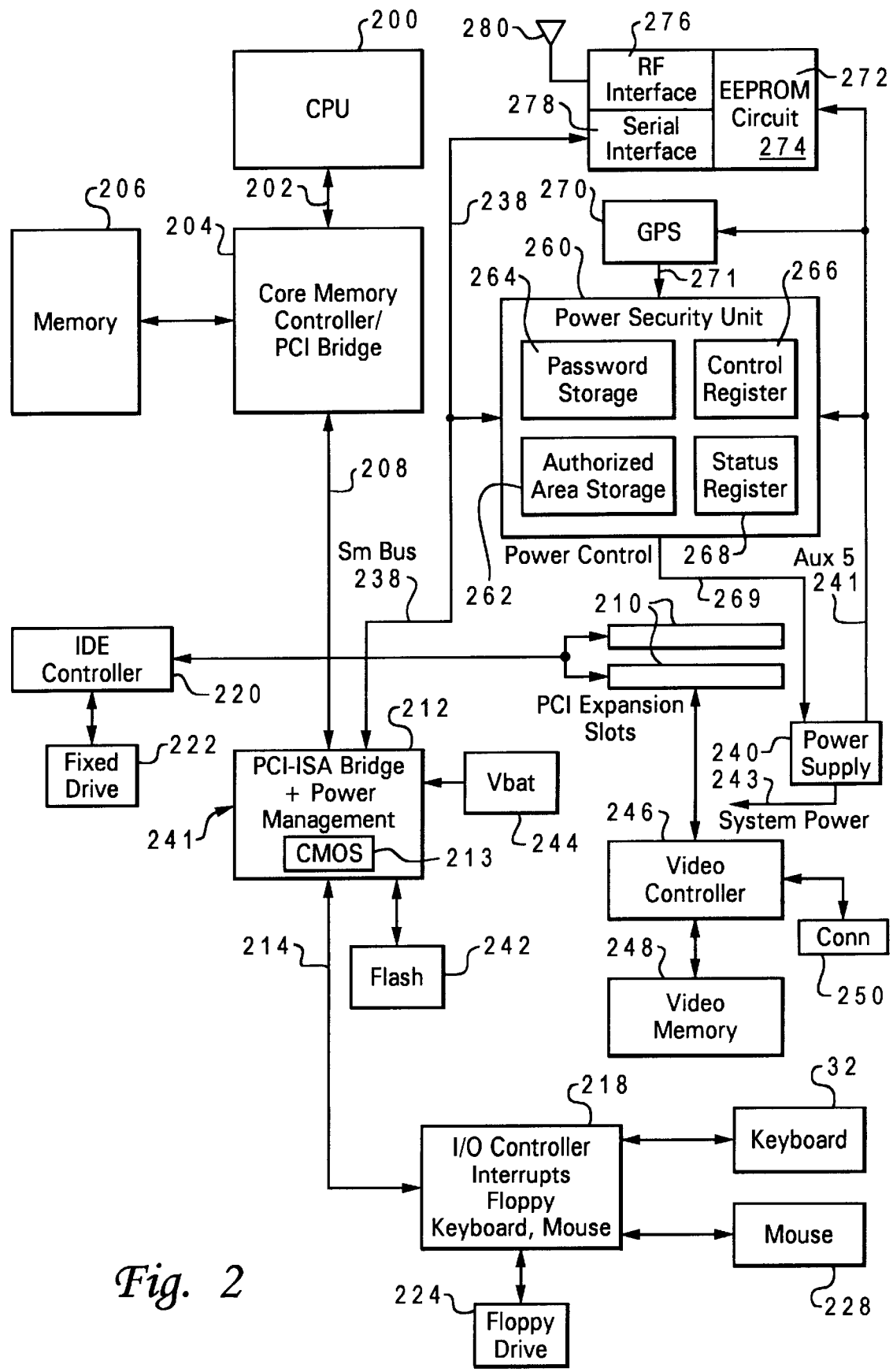
FIG. 2 depicts a more detailed pictorial representation of the data processing system of FIG. 1 in accordance with the method and system of the present invention.

FIG. 2 depicts a more detailed pictorial representation of the data processing system of FIG. 1 in accordance with the method and system of the present invention. Portable computer 30 includes a planar (also commonly called a motherboard or system board) which is mounted within portable computer 30 and provides a means for mounting and electrically interconnecting various components of portable computer 30 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 32, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and initialize the operating system.

Computer 30 includes a video controller 246 which may, for example, be plugged into one of PCI expansion slots 210. Video controller 246 is connected to video memory 248. The image in video memory 248 is read by controller 246 and displayed on display 34 which is coupled to video controller 246 through connector 250.

Portable computer 30 includes a power supply 240 which supplies full normal system power 243, and has an auxiliary power main AUX 5 241 which supplies full time power to the power management logic 212, a power security unit (PSU) 260 a global positioning system (GPS) circuit 270, and a wireless device 272.

Power security unit (PSU) 260 includes storage 262 for storing an authorized, geographical area within which portable computer 30 will be permitted to operate, a password storage 264 for storing a password whose correct entry is required prior to modifying the contents of storage 262, a control register 266 including a security bit, and a status register 268 including a password bit. PSU 260 receives constant, auxiliary power 241, and a signal 271 from GPS circuit 270. PSU 260 is coupled to SM bus 238.

A global positioning system (GPS) circuit 270 is included. GPS circuit 270 is available from multiple vendors. PSU 260, GPS 270, and device 272 are constantly powered. Therefore, GPS 270 is capable of constantly receiving the GPS coordinates of the current location of portable computer 30. GPS 270, then, outputs these coordinates utilizing signal line 271 to PSU 260. PSU 260 compares the current geographical coordinates to the authorized area stored in storage 262 to determine whether portable computer 30 is within the authorized area. If portable computer 30 is outside the authorized area, PSU 260 outputs a power control signal utilizing signal line 269 to cause power supply 240 to cease supplying system power 243.

The authorized area may be modified when PSU 260 is receives a correct password stored in storage 264. When the correct password is received by PSU 260, new coordinates may be received utilizing SM bus 238 and stored in storage 262.

A wireless device 272 includes an EEPROM storage circuit 274, a serial interface 278 for coupling device 272 to SM bus 238, and a wireless interface 276 for transmitting and receiving wireless, radio frequency (RF) signals utilizing antenna 280. Coordinates defining an authorized area may be received by device 272 utilizing RF interface 276, and stored in EEPROM storage circuit 274 if they are accompanied by a valid password. The coordinates may, thereafter, be output on SM bus 238 utilizing serial interface 278.

PSU 260, wireless device 272, and PCI/ISA bridge 212 are coupled together utilizing a system management (SM) bus 238. System management bus 238 is a two-wire, low speed, serial bus used to interconnect management and monitoring devices. Those skilled in the art will recognize that another bus within the planar may be utilized to interconnect these devices.

Figure 3A:
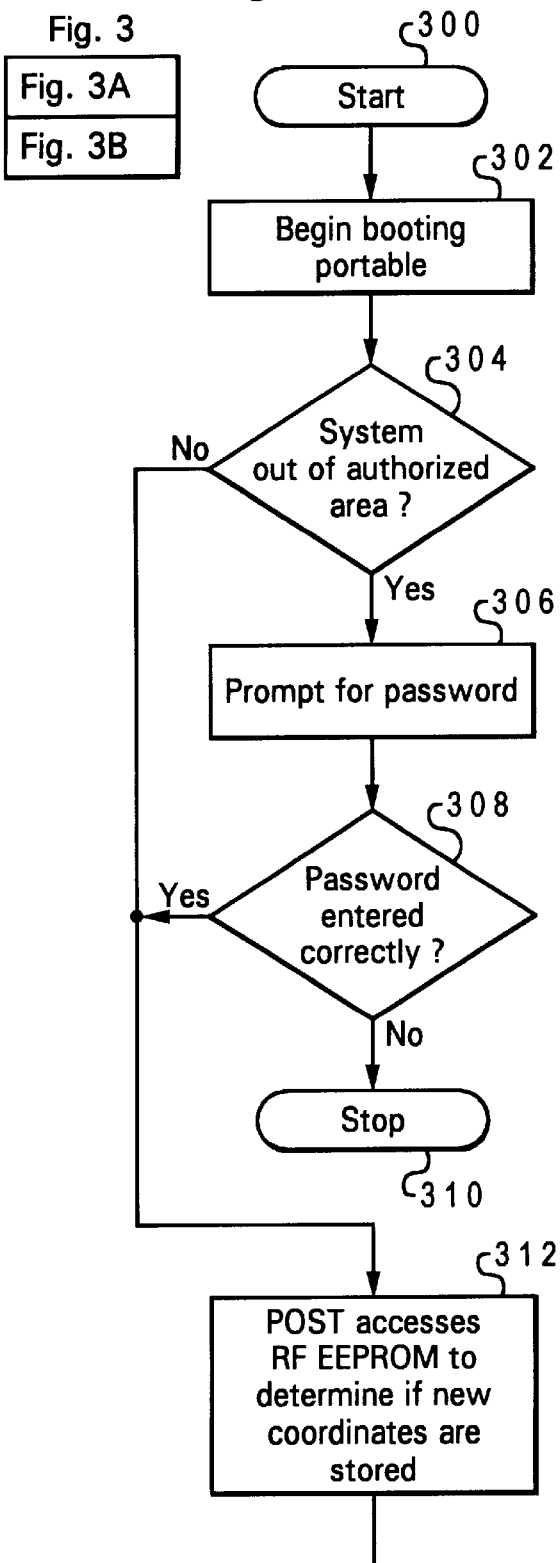
FIG. 3 illustrates a high level flow chart which depicts a portable computer being disabled when moved outside an authorized, geographical area in accordance with the method and system of the present invention.
Figure 3A:
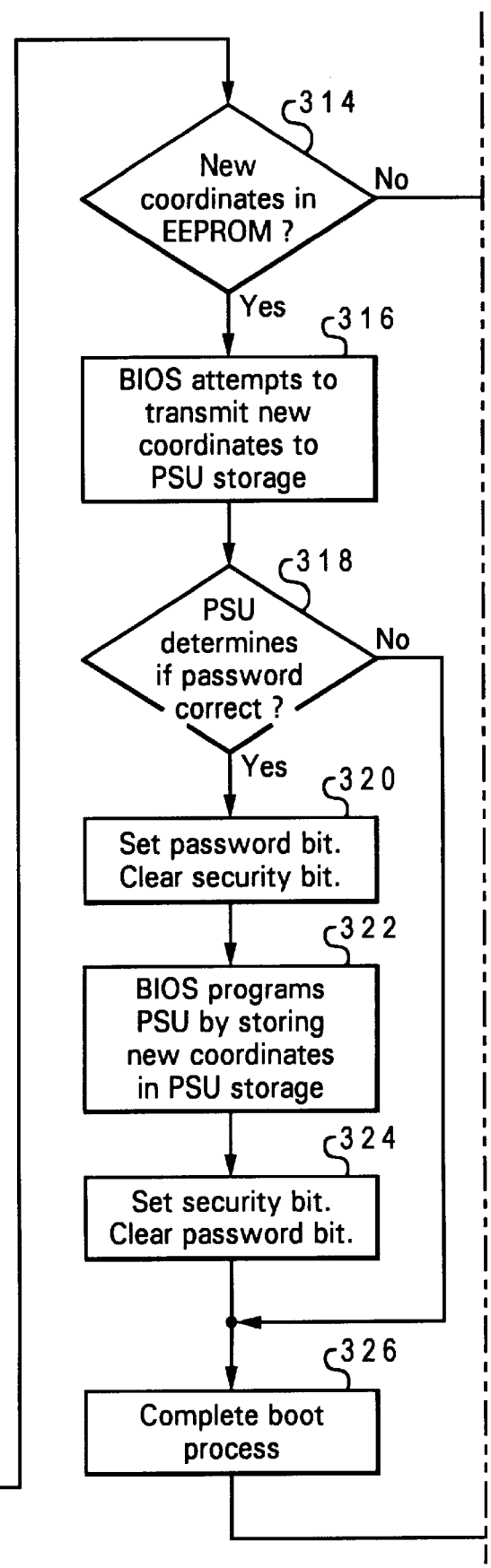
Figure 3B:
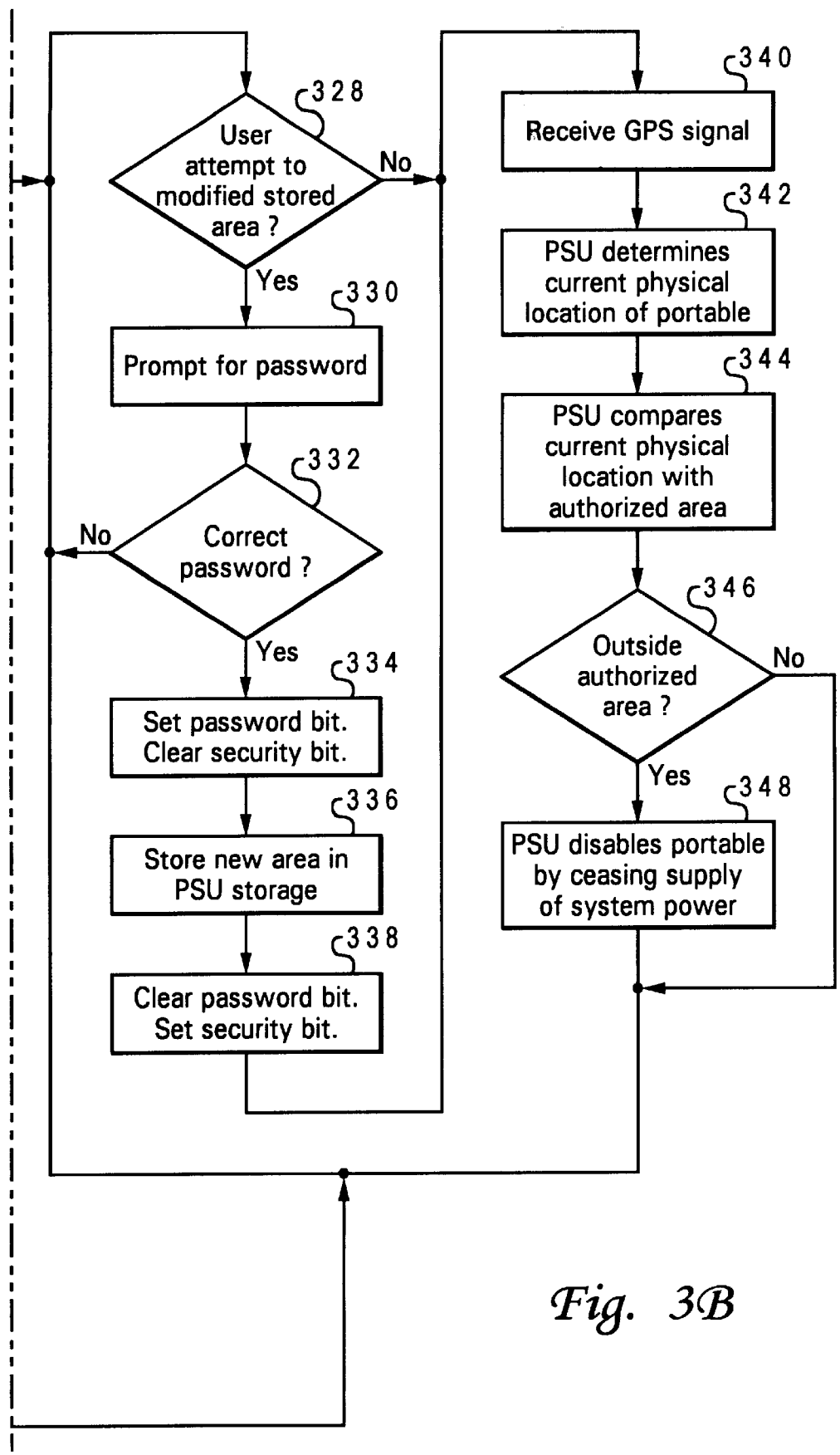

FIG. 3 illustrates a high level flow chart which depicts a portable computer being disabled when moved outside an authorized, geographical area in accordance with the method and system of the present invention. The process starts as depicted at block 300 and thereafter passes to block 302 which illustrates beginning the booting of portable computer 30. Next, block 304 depicts a determination of whether or not the system has been moved outside of the authorized area. If a determination is made that the portable computer system has been moved outside of the authorized area, the process passes to block 306 which illustrates the portable computer prompting for a password. Next, block 308 depicts a determination of whether or not a correct password was entered. If a determination is made that a correct password was not entered, the process terminates at block 310. Referring again to block 308, if a determination is made that the correct password was entered, the process passes to block 312. Referring again to block 304, if a determination is made that the portable has not been moved out of the authorized area, the process passes to block 312.

Block 312 depicts the power-on-self-test (POST) accessing EEPROM 274 to determine if new coordinates have been stored in EEPROM 274. Next, block 314 illustrates a determination of whether or not EEPROM 274 includes new coordinates. If a determination is made that EEPROM 274 does not include new coordinates, the process passes to block 328.

Referring again to block 314, if a determination is made that EEPROM 274 does include new coordinates, the process passes to block 316 which illustrates BIOS accessing EEPROM 274 utilizing SM bus 238 to obtain the new coordinates and the associated password, and attempt to store them in storage 264 in power security unit 260. The process passes to block 318 which depicts PSU 260 determining whether or not the password it received is correct. If a determination is made that the password is not correct, the process passes to block 326.

Referring again to block 318, if a determination is made that the password is correct, the process passes to block 320 which illustrates PSU 260 setting a password bit included within status register 268, and clearing a security bit included within control register 266. Thereafter, block 322 depicts BIOS programming PSU 260 by storing the new coordinates in storage 262. Next, block 324 illustrates clearing the password bit included within status register 268, and setting the security bit included within control register 266. The process then passes to block 326.

Block 326 illustrates the completion of the boot process. Thereafter, block 328 which depicts a determination of whether or not a user has attempted to modify the area stored in storage 262. If a user attempts to modify the area stored in storage 262, the process passes to block 330 which illustrates prompting a user for a password. Next, block 332 depicts a determination of whether or not the correct password was entered. If a determination is made that the correct password was not entered, the process passes back to block 328.

Referring again to block 332, if a determination is made that the correct password was entered, the process passes to block 334 which illustrates PSU 260 setting a password bit included within status register 268, and clearing a security bit included within control register 266. Thereafter, block 336 depicts storing the coordinates for the new area in PSU storage 262. Next, block 338 illustrates clearing the password bit included within status register 268, and setting the security bit included within control register 266. The process then passes to block 340.

Referring again to block 328, if a user has not attempted to modify the area stored in storage 262, the process passes to block 340. Block 340 depicts GPS circuit 270 receiving the GPS signal. Thereafter, block 342 illustrates PSU 260 determining a current geographical location of portable computer 30 utilizing the coordinates received from GPS circuit 270. Next, block 344 illustrates PSU 260 comparing the current geographical location of portable computer 30 with the authorized geographical area stored in storage 262.

The process then passes to block 346 which depicts a determination of whether or not portable computer 30 is currently located outside the authorized area. If a determination is made that portable computer 30 is not located outside the authorized area, the process passes to block 328. Referring again to block 346, if a determination is made that portable computer 30 is located outside the authorized area, the process passes to block 348 which illustrates PSU 260 disabling portable computer 30 utilizing power control signal 269 to cause power supply 240 to cease supplying system power 243. Portable computer 30 remains disabled until a user enters a privileged access password. The process then passes back to block 328.

FIG. 4 depicts a high level flow chart which illustrates a gate communicating with a portable computer system which passed through the gate in accordance with the method and system of the present invention. The process starts as depicted at block 400 and thereafter passes to block 402 which illustrates gate 20 receiving an RF signal from portable computer 30 including information identifying portable computer 30. Next, block 404 depicts gate 20 transmitting this identifying information to server 22.

Those skilled in the art will recognize that gate 20 may utilize network 24, RF signals, or any other suitable method to communicate with server 22.

The process then passes to block 406 which illustrates gate 20 receiving coordinates for an authorized area and a password from server 22. Thereafter, block 408 depicts gate 20 transmitting the received coordinates and password to portable computer 30. The process then terminates as illustrated at block 410.

FIG. 5 illustrates a high level flow chart which depicts a server computer system transmitting an authorized, geographical area for a particular portable computer in accordance with the method and system of the present invention. The process starts as depicted at block 500 and thereafter passes to block 502 which illustrates server 22 receiving information from gate 20 identifying a particular portable computer. Next, block 504 depicts server 22 determining coordinates which define an authorized area for the particular portable computer as well as a password. Thereafter, block 506 illustrates server 22 transmitting the coordinates and the password to gate 20. The process then terminates as depicted at block 508.

FIG. 6 depicts a high level flow chart which illustrates a portable computer system receiving updated coordinates when moved through a gate in accordance with the method and system of the present invention. The process starts as depicted at block 600 which illustrates a determination of whether or not portable computer 30 passed through gate 20. If a determination is made that portable computer 30 did not pass through gate 20, the process passes to back block 600. Referring again to block 600, if a determination is made that portable computer 30 did pass through gate 20, the process passes to block 602 which depicts device 272 transmitting its saved identifier information to gate 20. Next, block 604 illustrates portable computer 30 receiving new coordinates and a password from gate 20 if required. The new coordinates and password are stored in EEPROM 274 until portable computer 30 is next booted. The process then passes back to block 600.

While a preferred embodiment has been particularly shown and described, it will be understood by those skilled in the art that various changes in form and detail may be made therein without departing from the spirit and scope of the present invention.

What is claimed is:

1. A method in a data processing system for disabling a portable computer in response to said portable computer being moved outside of an authorized area of use, said method comprising the steps of:

establishing an authorized, geographical area of use, said authorized, geographical area being any geographical area capable of being defined, not limited to areas within an enclosure, and not bounded by a transmitter's broadcast range;

determining whether said portable computer is located outside of said authorized area; and in response to said portable computer being moved outside of said authorized area, said portable computer disabling itself, wherein said portable computer is inoperable when disabled.

2. The method according to claim 1, wherein said step of determining whether said portable computer is located outside of said authorized area further comprises the step of said portable computer determining whether said portable computer is located outside of said authorized area.

3. The method according to claim 2, further comprising the steps of:

establishing a location detection device within said portable computer for continuously receiving positioning information, said location detection device receiving constant auxiliary power;

utilizing said received positioning information to determine a current geographical location of said portable computer; and in response to said current geographical location being outside of said authorized area, disabling said portable computer.

4. The method according to claims 3, further comprising the step of in response to said portable computer being disabled, re-enabling said portable computer in response to a correct entry of a privileged access password.

5. The method according to claims 4, further comprising the step of permitting a modification of said authorized, geographical area only in response to a correct entry of said privileged access password.

6. The method according to claims 5, further comprising the steps of:

establishing a power security unit for storing said privileged access password and said authorized area;

said power security unit being coupled to a power supply and to a global positioning device, said power supply capable of supplying full system power required for said portable computer to operate;

said power security unit receiving said positioning information from said global positioning device;

said power security unit determining said current geographical location of said portable computer;

in response to said power security unit determining that said current geographical location of said portable computer is outside of said authorized area, said power security unit transmitting a power control signal to said power supply; and in response to a receipt of said power control signal by said power supply, said power supply ceasing supplying full system power.

7. The method according to claim 6, wherein said step of establishing an authorized, geographical area of use further comprises the step of establishing an authorized area being defined by an area included within a radius from a center longitude and center latitude point.

8. The method according to claim 7, further comprising the steps of:

establishing a gate capable of transmitting and receiving wireless signals;

moving said portable computer through said gate;

in response to said movement of said portable computer through said gate, said gate transmitting a wireless signal to said portable computer including an updated authorized, geographical area.

9. The method according to claim 8, further comprising the steps of:

said gate being coupled to a server computer system;

in response to said movement of said portable computer through said gate, said portable computer transmitting an identifier signal to said gate, said identifier signal including information identifying said portable computer;

in response to said gate receiving said identifier signal, said gate transmitting a request to said server computer system; and in response to said server receiving said request, said server transmitting a reply signal to said gate including said updated authorized, geographical region.

10. A data processing system for disabling a portable computer in response to said portable computer being moved outside of an authorized area of use, comprising:

said portable computer executing code for establishing an authorized, geographical area of use, said authorized, geographical area being any geographical area capable of being defined, not limited to areas within an enclosure, and not bounded by a transmitter's broadcast range;

said portable computer system executing code for determining whether said portable computer is located outside of said authorized area; and in response to said portable computer being moved outside of said authorized area, means for said portable computer disabling itself, wherein said portable computer is inoperable when disabled.

11. The system according to claim 10, further comprising:

a location detection device included within said portable computer for continuously receiving positioning information, said location detection device receiving constant auxiliary power;

said portable computer executing code for utilizing said received positioning information to determine a current geographical location of said portable computer; and in response to said current geographical location being outside of said authorized area, said portable computer capable of being disabled.

12. The system according to claims 11, further comprising in response to said portable computer being disabled, said portable computer capable of being re-enabled in response to a correct entry of a privileged access password.

13. The system according to claims 12, further comprising said portable computer executing code for permitting a modification of said authorized, geographical area only in response to a correct entry of said privileged access password.

14. The system according to claims 13, further comprising:

a power security unit included within said portable computer for storing said privileged access password and said authorized area;

said power security unit capable of being coupled to a power supply and to a global positioning device, said power supply capable of supplying full system power required for said portable computer to operate;

said power security unit capable of receiving said positioning information from said global positioning device;

said power security unit executing code for determining said current geographical location of said portable computer;

in response to said power security unit determining that said current geographical location of said portable computer is outside of said authorized area, said power security unit capable of transmitting a power control signal to said power supply; and in response to a receipt of said power control signal by said power supply, said power supply capable of ceasing supplying full system power.

15. The system according to claim 14, further comprising said portable computer executing code for establishing an authorized area being defined by an area included within a radius from a center longitude and center latitude point.

16. The system according to claim 15, further comprising:

a gate capable of transmitting and receiving wireless signals;

said portable computer capable of being moved through said gate; and in response to said movement of said portable computer through said gate, said gate capable of transmitting a wireless signal to said portable computer including an updated authorized, geographical area.

17. The system according to claim 16, further comprising:

said gate capable of being coupled to a server computer system;

in response to said movement of said portable computer through said gate, said portable computer executing code for transmitting an identifier signal to said gate, said identifier signal including information identifying said portable computer;

in response to said gate receiving said identifier signal, said gate capable of transmitting a request to said server computer system; and in response to said server receiving said request, said server executing code for transmitting a reply signal to said gate including said updated authorized, geographical region.

18. A data processing system for disabling a portable computer in response to said portable computer being moved outside of an authorized area of use, comprising:

said portable computer executing code for establishing an authorized, geographical area of use, said authorized, geographical area being any geographical area capable of being defined by a radius and a center longitude and center latitude point, not limited to areas within an enclosure, and not bounded by a transmitter's broadcast range, said authorized area being defined by an area included within a radius from a center longitude and center latitude point;

a location detection device included within said portable computer for continuously receiving positioning information, said location detection device receiving constant auxiliary power;

a power security unit included within said portable computer for storing a privileged access password and said authorized area;

said power security unit capable of being coupled to a power supply and to a global positioning device, said power supply capable of supplying full system power required for said portable computer to operate;

said power security unit capable of receiving said positioning information from said global positioning device;

said power security unit executing code for determining a current geographical location of said portable computer;

in response to said power security unit determining that said current geographical location of said portable computer is outside of said authorized area, said power security unit capable of transmitting a power control signal to said power supply;

in response to a receipt of said power control signal by said power supply, said power supply capable of ceasing supplying full system power, wherein said portable computer is disabled;

in response to said portable computer being disabled, said portable computer capable of being re-enabled in response to a correct entry of a privileged access password;

said portable computer executing code for permitting a modification of said authorized, geographical area only in response to a correct entry of said privileged access password;

a gate capable of transmitting and receiving wireless signals;

said portable computer capable of being moved through said gate;

in response to said movement of said portable computer through said gate, said gate capable of transmitting a wireless signal to said portable computer including an updated authorized, geographical area;

said gate capable of being coupled to a server computer system;

in response to said movement of said portable computer through said gate, said portable computer executing code for transmitting an identifier signal to said gate, said identifier signal including information identifying said portable computer;

in response to said gate receiving said identifier signal, said gate capable of transmitting a request to said server computer system;

in response to said server receiving said request, said server executing code for transmitting a reply signal to said gate including said updated authorized, geographical region.

19. A method in a data processing system for disabling a portable computer in response to said portable computer being moved outside of an authorized area of use, said method comprising the steps of:

establishing an authorized, geographical area of use, said authorized, geographical area being any geographical area capable of being defined, not limited to areas within an enclosure, and not bounded by a transmitter's broadcast range;

determining whether said portable computer is located outside of said authorized area;

in response to said portable computer being moved outside of said authorized area, disabling said portable computer, wherein said portable computer is inoperable when disabled;

establishing a location detection device within said portable computer for continuously receiving positioning information, said location detection device receiving constant auxiliary power;

utilizing said received positioning information to determine a current geographical location of said portable computer;

in response to said current geographical location being outside of said authorized area, disabling said portable computer; and in response to said portable computer being disabled, re-enabling said portable computer in response to a correct entry of a privileged access password.

20. The method according to claims 18, further comprising the step of permitting a modification of said authorized, geographical area only in response to a correct entry of said privileged access password.

21. The method according to claims 20, further comprising the steps of:

establishing a power security unit for storing said privileged access password and said authorized area;

said power security unit being coupled to a power supply and to a global positioning device, said power supply capable of supplying full system power required for said portable computer to operate;

said power security unit receiving said positioning information from said global positioning device;

said power security unit determining said current geographical location of said portable computer;

in response to said power security unit determining that said current geographical location of said portable computer is outside of said authorized area, said power security unit transmitting a power control signal to said power supply; and in response to a receipt of said power control signal by said power supply, said power supply ceasing supplying full system power.

22. The method according to claim 21, wherein said step of establishing an authorized, geographical area of use further comprises the step of establishing an authorized area being defined by an area included within a radius from a center longitude and center latitude point.

23. The method according to claim 22, further comprising the steps of:

establishing a gate capable of transmitting and receiving wireless signals;

moving said portable computer through said gate;

in response to said movement of said portable computer through said gate, said gate transmitting a wireless signal to said portable computer including an updated authorized, geographical area.

24. The method according to claim 23, further comprising the steps of:

said gate being coupled to a server computer system;

in response to said movement of said portable computer through said gate, said portable computer transmitting an identifier signal to said gate, said identifier signal including information identifying said portable computer;

in response to said gate receiving said identifier signal, said gate transmitting a request to said server computer system; and in response to said server receiving said request, said server transmitting a reply signal to said gate including said updated authorized, geographical region.

25. A data processing system for disabling a portable computer in response to said portable computer being moved outside of an authorized area of use, comprising:

said portable computer executing code for establishing an authorized, geographical area of use, said authorized, geographical area being any geographical area capable of being defined, not limited to areas within an enclosure, and not bounded by a transmitter's broadcast range;

said portable computer system executing code for determining whether said portable computer is located outside of said authorized area;

in response to said portable computer being moved outside of said authorized area, said portable computer capable of being disabled, wherein said portable computer is inoperable when disabled;

a location detection device included within said portable computer for continuously receiving positioning information, said location detection device receiving constant auxiliary power;

said portable computer executing code for utilizing said received positioning information to determine a current geographical location of said portable computer;

in response to said current geographical location being outside of said authorized area, said portable computer capable of being disabled; and in response to said portable computer being disabled, said portable computer capable of being re-enabled in response to a correct entry of a privileged access password.

26. The system according to claims 25, further comprising said portable computer executing code for permitting a modification of said authorized, geographical area only in response to a correct entry of said privileged access password.

27. The system according to claims 26, further comprising:

a power security unit included within said portable computer for storing said privileged access password and said authorized area;

said power security unit capable of being coupled to a power supply and to a global positioning device, said power supply capable of supplying full system power required for said portable computer to operate;

said power security unit capable of receiving said positioning information from said global positioning device;

said power security unit executing code for determining said current geographical location of said portable computer;

in response to said power security unit determining that said current geographical location of said portable computer is outside of said authorized area, said power security unit capable of transmitting a power control signal to said power supply; and in response to a receipt of said power control signal by said power supply, said power supply capable of ceasing supplying full system power.

28. The system according to claim 27, further comprising said portable computer executing code for establishing an authorized area being defined by an area included within a radius from a center longitude and center latitude point.

29. The system according to claim 28, further comprising:

a gate capable of transmitting and receiving wireless signals;

said portable computer capable of being moved through said gate; and in response to said movement of said portable computer through said gate, said gate capable of transmitting a wireless signal to said portable computer including an updated authorized, geographical area.

30. The system according to claim 29, further comprising:

said gate capable of being coupled to a server computer system;

in response to said movement of said portable computer through said gate, said portable computer executing code for transmitting an identifier signal to said gate, said identifier signal including information identifying said portable computer;

in response to said gate receiving said identifier signal, said gate capable of transmitting a request to said server computer system; and in response to said server receiving said request, said server executing code for transmitting a reply signal to said gate including said updated authorized, geographical region.

* * * * *

UNITED STATES PATENT AND TRADEMARK OFFICE
CERTIFICATE OF CORRECTION

PATENT NO.    : 6,166,688
DATED         : December 26, 2000
INVENTOR(S)   : Cromer et al.

It is certified that error appears in the above-identified patent and that said Letters Patent is hereby corrected as shown below:

Title page,
Item [75], please add the inventor -- James Peter Ward, Raleigh, North Carolina (US) --

Signed and Sealed this

Twenty-seventh Day of May, 2003

JAMES E. ROGAN
*Director of the United States Patent and Trademark Office*